(12) United States Patent　　　　(10) Patent No.:　US 12,659,894 B2

He et al.　　　　　　　　　　　　　(45) Date of Patent:　Jun. 16, 2026

(54) SYNCHRONIZATION SIGNAL BLOCK TRANSMISSIONS IN WIRELESS COMMUNICATIONS

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Saratoga, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/638,208

(22) Filed: Apr. 17, 2024

(65) Prior Publication Data

US 2024/0276408 A1　　Aug. 15, 2024

Related U.S. Application Data

(63) Continuation of application No. 17/593,592, filed as application No. PCT/CN2020/120011 on Oct. 9, 2020, now Pat. No. 11,985,614.

(51) Int. Cl.
　H04W 56/00　　　(2009.01)
　H04L 5/00　　　　(2006.01)
　H04L 41/0803　　(2022.01)

(52) U.S. Cl.
　CPC ......... H04W 56/001 (2013.01); H04L 5/0048 (2013.01); H04L 41/0803 (2013.01)

(58) Field of Classification Search
　CPC ............ H04W 56/001; H04W 56/0015; H04L 5/0048; H04L 41/0803; H04L 5/0091;
　　　　　　(Continued)

(56) References Cited

U.S. PATENT DOCUMENTS

2019/0045559 A1　2/2019　Huang et al.
2019/0141742 A1　5/2019　Zhou et al.
　　　　　　(Continued)

FOREIGN PATENT DOCUMENTS

CN　　109845372　　　6/2019
CN　　111294825 A　　6/2020
　　　　　　(Continued)

OTHER PUBLICATIONS

Huawei et al., "PHY design in 52.6-71 GHz using NR waveform", 3GPP TSG RAN WG1 Meeting #102-e, R1-2005241. Aug. 17-18, 2020, 10 sheets.
　　　　　　(Continued)

*Primary Examiner* — Obaidul Huq
(74) *Attorney, Agent, or Firm* — Fay Kaplun & Marcin, LLP

(57)　　　　　　ABSTRACT

A cell transmits synchronization signal blocks (SSB) to a user equipment (UE) for the UE to synchronize with the cell. The cell configures a discovery reference signal (DRS) window for synchronization signal block (SSB) transmission to a user equipment (UE), determines that a channel in an unlicensed spectrum is not occupied and transmits multiple SSBs to the UE in response to determining that the channel in the unlicensed spectrum is not occupied.

15 Claims, 12 Drawing Sheets

(58) Field of Classification Search
CPC . H04L 27/2602; H04L 27/261; H04L 5/0032;
H04L 5/0023
USPC .......................................................... 370/254
See application file for complete search history.

(56) References Cited

U.S. PATENT DOCUMENTS

| | | | |
|---|---|---|---|
| 2019/0260533 A1 | 8/2019 | Manolakos et al. | |
| 2020/0119898 A1 | 4/2020 | Orsino et al. | |
| 2021/0092696 A1* | 3/2021 | Ko | H04W 76/27 |
| 2021/0266214 A1* | 8/2021 | Sun | H04W 74/0808 |
| 2021/0297212 A1* | 9/2021 | Zhang | H04W 56/00 |
| 2021/0385774 A1* | 12/2021 | He | H04W 56/0015 |
| 2022/0015146 A1* | 1/2022 | Rune | H04W 74/0816 |
| 2022/0086776 A1 | 3/2022 | Li | |
| 2022/0272650 A1 | 8/2022 | Ko et al. | |
| 2022/0353048 A1* | 11/2022 | Kim | H04L 5/06 |

FOREIGN PATENT DOCUMENTS

| | | |
|---|---|---|
| CN | 111615854 | 9/2020 |
| CN | 111656844 A | 9/2020 |
| WO | 2020/030181 | 2/2020 |
| WO | 2020/167208 | 8/2020 |

OTHER PUBLICATIONS

Qualcomm Incorporated, "Feature lead summary on initial access signals and channels for NR-U", 3GPP TSG RAN WG1 Meeting #98bis, RI-1911526, Oct. 22, 2019, 48 sheets.

Moderator (Lenovo), "Summary #2 of email discussion [ 101 -e-NR-unlic-NRU-DL_Signals_and_Channels-03] on CSI-RS and related aspects", 3GPP TSG RAN WG1#101-e, R !-2005013, Jun. 6, 2020, 46 sheets.

Xiaomi, "On SSB transmission in NR unlicensed", 3GPP TSG RAN WG1 Meeting #94bis, R1-1811416, Sep. 29, 2018, 3 sheets.

* cited by examiner

UE 110

| 505<br>a(6) | 510<br>OFDM Symbol Number <x,y> |
|---|---|
| 0 | <0,2> - Configuration 605 |
| 1 | <2,0> - Configuration 610<br><3,1> - Configuration 615<br><1,3> - Configuration 620 |

Table 500

Fig. 5

$c(n) = \bar{c}\big((n + a(6))\, mod\, 127\big)$, $\bar{c}$ is generated from the different primitive polynomial

| | | | |
|---|---|---|---|
| 131 | (10000011) | $x^7+x+1$ | n=127 (primitive) |
| 137 | (10001001) | $x^7+x^2+1$ | n=127 (primitive) |
| 143 | (10001111) | $x^7+x^3+x^2+x+1$ | n=127 (primitive) |
| 145 | (10010001) | $x^7+x^4+1$ | n=127 (primitive) |
| 157 | (10011101) | $x^7+x^4+x^3+x^2+1$ | n=127 (primitive) |
| 167 | (10100111) | $x^7+x^5+x^2+x+1$ | n=127 (primitive) |
| 171 | (10101011) | $x^7+x^5+x^3+x+1$ | n=127 (primitive) |
| 185 | (10111001) | $x^7+x^5+x^4+x^3+1$ | n=127 (primitive) |
| 191 | (10111111) | $x^7+x^5+x^4+x^3+x^2+x+1$ | n=127 (primitive) |
| 193 | (11000001) | $x^7+x^6+1$ | n=127 (primitive) |
| 203 | (11001011) | $x^7+x^6+x^3+x+1$ | n=127 (primitive) |
| 211 | (11010011) | $x^7+x^6+x^4+x+1$ | n=127 (primitive) |
| 213 | (11010101) | $x^7+x^6+x^4+x^2+1$ | n=127 (primitive) |
| 229 | (11100101) | $x^7+x^6+x^5+x^2+1$ | n=127 (primitive) |
| 239 | (11101111) | $x^7+x^6+x^5+x^3+x^2+x+1$ | n=127 (primitive) |
| 241 | (11110001) | $x^7+x^6+x^5+x^4+1$ | n=127 (primitive) |
| 247 | (11110111) | $x^7+x^6+x^5+x^4+x^2+x+1$ | n=127 (primitive) |
| 253 | (11111101) | $x^7+x^6+x^5+x^4+x^3+x^2+1$ | n=127 (primitive) |

Fig. 8

Table: value of v for PBCH scrambling

| $\bar{c}(i)$, 4th LSB of SFN, 2nd LSB of SFN | Value of v |
|---|---|
| 000 | 0 |
| 001 | 1 |
| 010 | 2 |
| 011 | 3 |
| 100 | 4 |
| 101 | 5 |
| 110 | 6 |
| 111 | 7 |

PBCH $a(i)$ $C(i)$ $\bar{a}(i)$ $\bar{a}(i) = (a(i) + \bar{c}(i)) \bmod 2$ $\bar{c}(i) = c(i + v \cdot M)$ $M_Q = \log_2 n$, where $n$ denotes the number of supported $Q$ values

SYNCHRONIZATION SIGNAL BLOCK TRANSMISSIONS IN WIRELESS COMMUNICATIONS

BACKGROUND

A user equipment (UE) may scan one or more frequency bands and monitor for synchronization information broadcast by a cell of the network. For example, the cell may transmit multiple synchronization signal blocks (SSBs) within a particular time window. Once detected, the UE may acquire time and frequency synchronization with the cell using the synchronization information.

In some networks, signaling between the UE and a cell of the network may be performed over the unlicensed spectrum. The unlicensed spectrum is shared by different devices using different communication protocols. Access to the unlicensed spectrum may implicate various regulations and/or standards. For instance, Listen-Before-Talk (LBT) may be implemented in accordance with these regulations and/or standards to access the unlicensed spectrum for communications.

For unlicensed operation, the number of candidate SSB positions may be increased to account for LBT failure. However, conventional techniques for acquiring cell timing are unable to handle the increase in candidate SSB positions. Accordingly, there is a need for mechanisms configured to enable the UE to determine cell timing when the number of candidate SSB positions is increased for unlicensed operation.

SUMMARY

Some exemplary embodiments are related to a baseband processor configured to perform operations. The operations include configuring a discovery reference signal (DRS) window for synchronization signal block (SSB) transmission to a user equipment (UE), determining that a channel in an unlicensed spectrum is not occupied and transmitting multiple SSBs to the UE in response to determining that the channel in the unlicensed spectrum is not occupied.

Other exemplary embodiments are related to a cell including a transceiver configured to communicate with a user equipment (UE) and a processor communicatively coupled to the transceiver and configured to perform operations. The operations include configuring a discovery reference signal (DRS) window for synchronization signal block (SSB) transmission to a user equipment (UE), determining that a channel in an unlicensed spectrum is not occupied and transmitting multiple SSBs to the UE in response to determining that the channel in the unlicensed spectrum is not occupied.

BRIEF DESCRIPTION OF THE DRAWINGS

FIG. 5 shows a table that illustrates how a part of the SSB index may be implicitly signaled based on the symbol location of the primary synchronization signal (PSS) and the secondary synchronization symbol (SSS) according to various exemplary embodiments.

FIG. 8 shows a table that includes various examples of different binary scrambling codes that may be used to scramble the PSS or SSS according to various exemplary embodiments.

DETAILED DESCRIPTION

Figure 1:
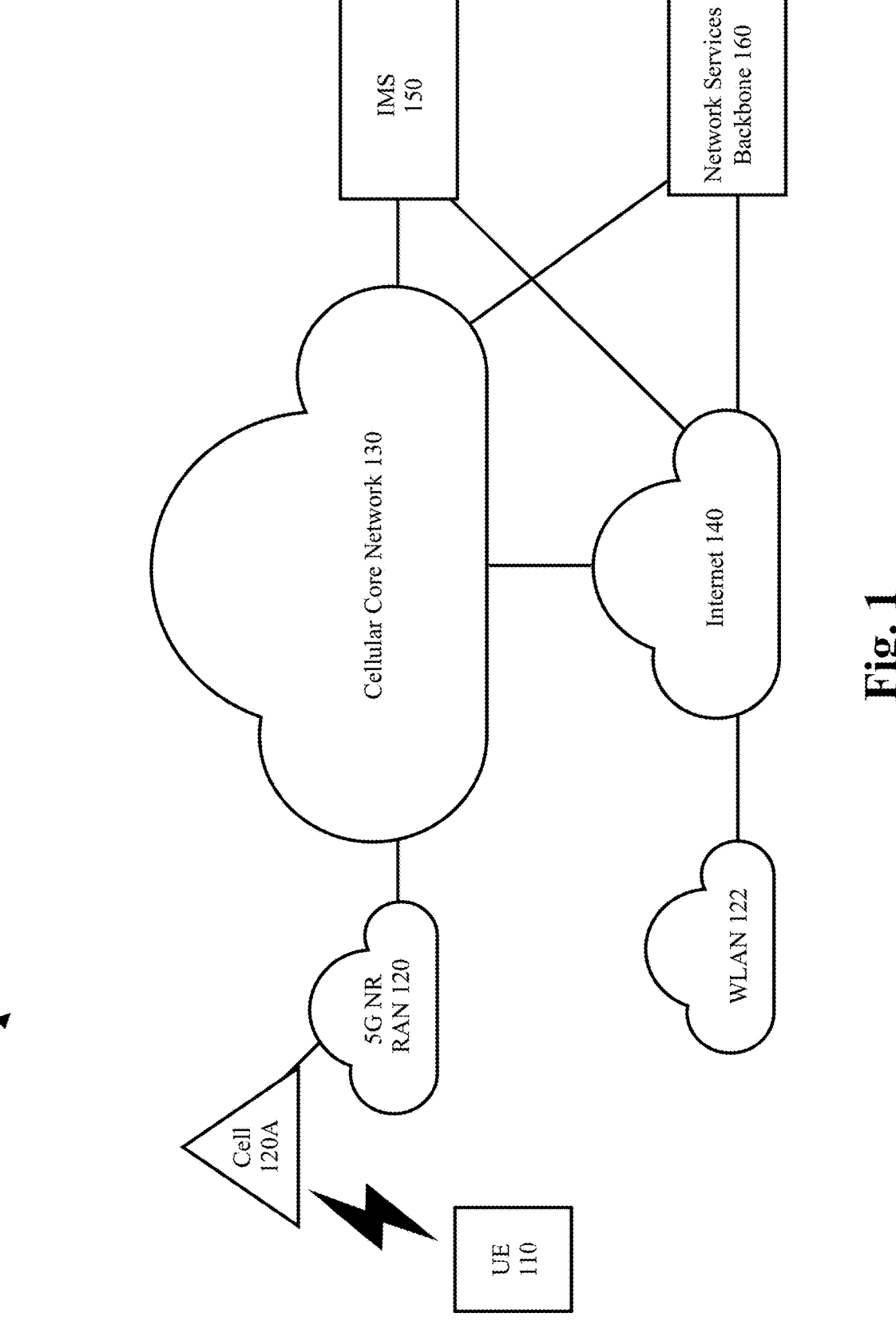
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods for implementing various exemplary techniques related to a user equipment (UE) acquiring synchronization with a cell of a network via synchronization signal blocks (SSBs).

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to the UE communicating with a 5G New Radio (NR) network that is capable of operating in the unlicensed spectrum. However, reference to a 5G NR network is merely provided for illustrative purposes. The exemplary embodiments may apply to any type of network operating in the unlicensed spectrum.

The unlicensed spectrum is a shared transmission medium that may be used by a plurality of different devices utilizing a plurality of different communication protocols. Access to the unlicensed spectrum for 5G NR purposes may implicate various regulations and/or standards. For instance, Listen-Before-Talk (LBT) may be implemented in accordance with these regulations and/or standards to access the unlicensed spectrum for communications. LBT may relate to determining whether channels in the unlicensed spectrum are occupied by other signals prior to performing a transmission over the unlicensed spectrum.

In addition, the exemplary embodiments are further described with regard to a discovery reference signal (DRS) window. Generally, a DRS refers to a set of reference signals and/or synchronization signals transmitted by a cell. The contents of the DRS may be used by the UE for various operations such as, but not limited to, cell detection, cell search procedures, channel state information (CSI) detection, CSI measurement, beam selection, beam management and radio resource management (RRM). The DRS may be transmitted periodically in a time window referred to as a DRS window. Each DRS window is configured to be a predetermined duration (e.g., 2 milliseconds (ms), 5 ms, 10 ms, etc.) and occur at a predetermined periodicity (e.g., 20 ms, 40 ms, 80 ms, 140 ms, etc.). For example, a DRS window of (x) ms may be scheduled to occur every (y) ms. However, any reference to DRS and a DRS window is merely provided for illustrative purposes, different entities may refer to similar concepts by a different name.

A cell may transmit multiple SSBs within a DRS window. Those skilled in the art will understand that an SSB may enable the UE to acquire time and frequency synchronization with a cell. For example, a cell of the 5G NR network may periodically transmit multiple SSBs. Each SSB may include contents such as, but not limited to, a physical cell ID (PCI), at least one primary synchronization signal (PSS), at least one secondary synchronization signal (SSS), at least one physical broadcast channel (PBCH) demodulation reference signal (DM-RS) and PBCH data. During a cell search, the UE may receive one or more of the SSBs. The contents of the SSBs may enable the UE to acquire time and frequency synchronization with the cell.

In 5G NR, the cell may transmit up to (L) SSBs in a half frame, where (L) is dependent on the frequency range. The candidate SSBs in a half frame may be indexed in ascending order in time from 0 to L−1. The UE may determine the SSB index based on the configuration of the SSB. For example, when L is less than or equal to 8, the SSB index may be determined based on the detected PBCH DM-RS sequence. When L is greater than 8 and less than or equal to 64, the SSB index may be determined based on a combination of the detected PBCH DM-RS sequence and the PBCH payload. The UE may establish cell timing based on the SSB index, the candidate positions and/or the PBCH payload.

The exemplary embodiments relate to expanding the number of candidate SSB positions within a DRS window (e.g., L is greater than 64). This may be implemented to account for LBT failure during SSB transmission. In one aspect, the exemplary embodiments include implementing techniques that enable the UE to determine cell timing when the number of candidate SSB positions is expanded within the DRS window. In a second aspect, the exemplary embodiments describe a mechanism that allows a UE to determine the quasi-co-location (QCL) assumptions for monitoring a control resource set (CORESET) across different DRS windows.

FIG. 1 shows a network arrangement 100 according to various exemplary embodiments. The network arrangement 100 includes the UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IOT) devices, etc. An actual network arrangement may include any number of UEs being used by any number of users. Thus, the example of a single UE 110 is only provided for illustrative purposes.

The UE 110 may be configured to communicate directly with one or more networks. In the example of the network arrangement 100, the UE 110 may wirelessly communicate with a 5G new radio (NR) radio access network (5G NR RAN) 120 and a wireless local access network (WLAN) 122. The 5G NR RAN 120 may be configured to operate in the unlicensed spectrum. The UE 110 may also communicate with other types of networks (e.g., 5G cloud RAN, a next generation RAN (NG-RAN), an LTE RAN, a legacy RAN etc.). The UE 110 may also communicate with networks over a wired connection. Therefore, the UE 110 may include a 5G NR chipset to communicate with the 5G NR RAN 120 and an ISM chipset to communicate with the WLAN 122.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a cell 120A. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the cell 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

The cell 120A may be equipped with one or more communication interfaces. For example, the cell 120A may be equipped with a communication interface that is configured to communicate with UEs over the unlicensed spectrum. Further, the cell 120A may be configured with various processing components that are configured to perform various operations such as, but not limited to, receiving signals from UEs and other network components, processing received signals and generating signals for transmission. For example, the cell 120A may be equipped with one or more processors. The processors may include one or more baseband processors and/or one or more applications processors. These processors may be configured to execute software and/or firmware. In another example, the cell may be equipped with an integrated circuit with or without firmware. For example, the integrated circuit may include input circuitry to receive signals, processing circuitry to process the signals and other information and output circuitry to output generated signals and information to other components (e.g., a communication interface, a transceiver, etc.). The functionality described herein for the cell 120A may be implemented in any of these or other configurations known in the art for a cell of a network.

In addition to the networks 120 and 122 the network arrangement 100 also includes a cellular core network 130. The cellular core network 130 may be considered to be the interconnected set of components that manages the operation and traffic of the cellular network. The network arrangement 100 also includes the Internet 140, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
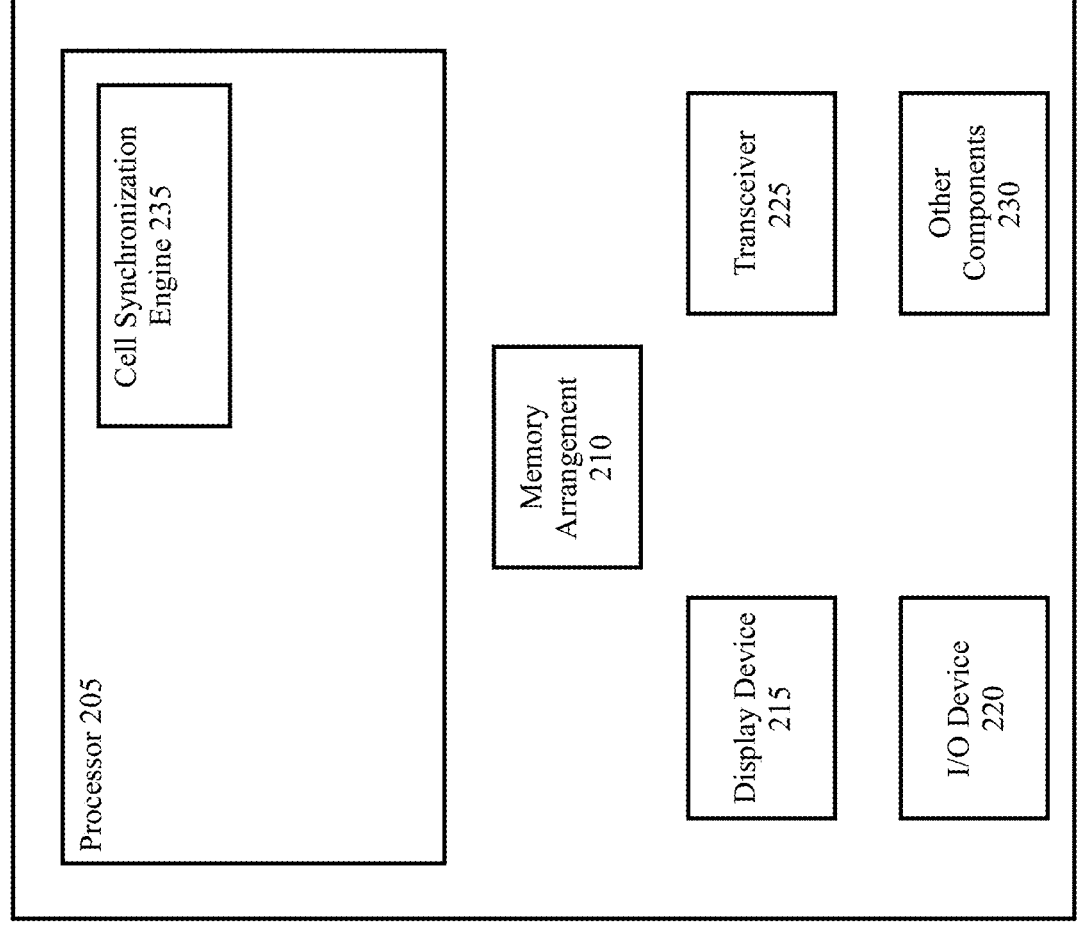
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a cell synchronization engine 235. The cell synchronization engine 235 may perform various operations related to the UE 110 synchronizing with a cell such as determining an SSB index and acquiring cell timing.

The above referenced engine each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and the WLAN 122. Accordingly, the transceiver 225 may operate on a variety of different frequencies or channels (e.g., set of consecutive frequencies).

To synchronize with a 5G NR cell (e.g., cell 120A), the UE 110 may acquire cell timing from an SSB. For example, the 5G NR cell may broadcast SSB periodically over a particular frequency band using any appropriate subcarrier spacing (SCS) (e.g., 15 kilohertz (Khz), 30 Khz, 120 Khz, 240 Khz, etc.). When tuned to this frequency band, the UE 110 may detect and decode the contents of the SSB to synchronize with the 5G NR cell. Those skilled in the art will understand that each SSB may include content such as, but not limited to, a cell ID, a PSS, a SSS, PBCH data, master MIB, etc. However, any reference to an SSB or a particular SSB configuration is merely provided for illustrative purposes. The exemplary embodiments may utilize any appropriate type of synchronization information.

The cell 120A may transmit multiple SSBs within a DRS window. As indicated above, the candidate SSBs in a half a frame (e.g., a conventional DRS window size) may be indexed in ascending order in time from 0 to L−1. The UE may determine the SSB index based on the configuration of the SSB. For example, when L is less than or equal to 8, the SSB index may be determined based on the detected PBCH DM-RS sequence. When L is greater than 8 and less than or equal to 64, the SSB index may be determined based on a combination of the detected PBCH DM-RS sequence and the PBCH payload. The UE 110 may establish cell timing based on the SSB index, the candidate positions and the PBCH payload.

The exemplary embodiments are described with regard to an extended DRS window, an example of which is provided below with regard to FIG. 3. The extended DRS window allows for more candidate SSB positions (e.g., L is greater than 64) and thus, a larger SSB index (e.g., 7-bits or any other appropriate size). The larger SSB index cannot be determined in the conventional manner. The exemplary embodiments described below include techniques for determining the SSB index for the extended DRS window.

Figure 3:
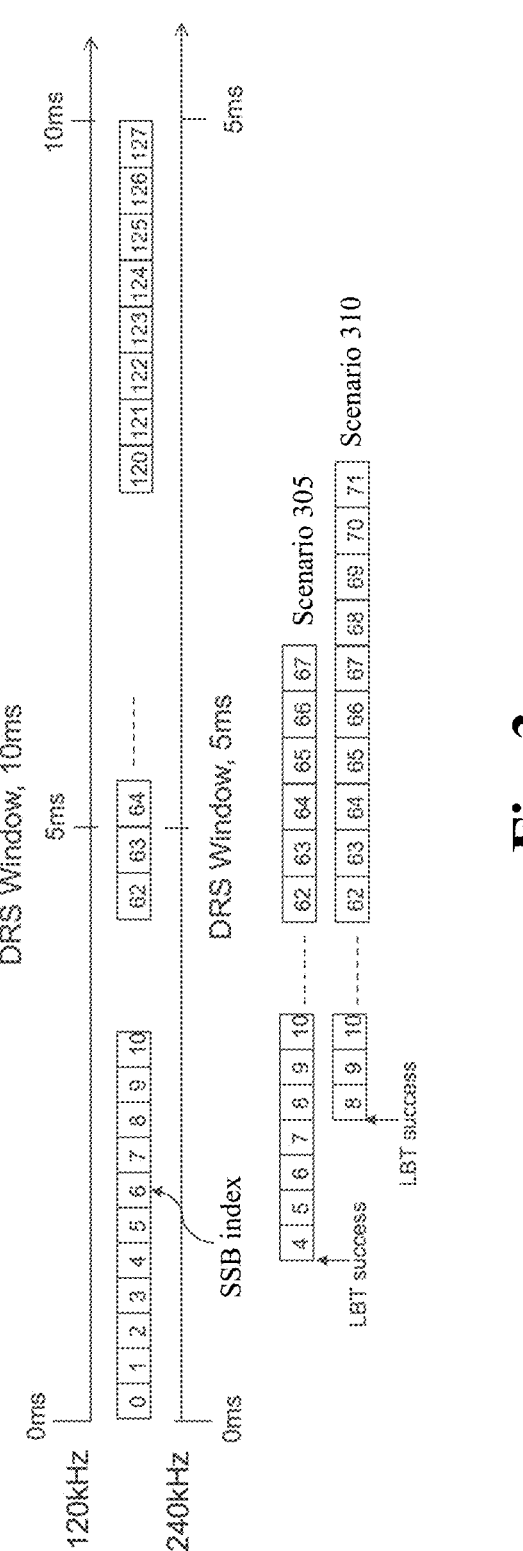
FIG. 3 shows an example of an extended DRS window according to various exemplary embodiments according to various exemplary embodiments.

FIG. 3 shows illustrates an example of an exemplary DRS window according to various exemplary embodiments. The exemplary DRS window may be extended for a SCS (e.g., 120 Khz, 240 Khz, etc.) to (X) ms, where (x) is equal to 5*(N). In the example shown in FIG. 3, N is equal to 2 and thus, the exemplary DRS window is extended to 5*N=5*2=10 ms. In some embodiments, the maximum number of candidate SSB positions within a DRS window (Y) may be 128. For example, as shown in FIG. 3, the maximum number of candidate SSB positions may be 128 for a SCS of 120 Khz or 240 Khz.

As mentioned above, the increase in candidate SSB positions may be used to account for LBT failure. The following exemplary scenarios demonstrate that when SSBs are dropped due to LBT failure, the SSB may be cyclically wrapped around to the end of the burst set transmission. Exemplary scenario 305 shows LBT success occurring prior to SSB candidate position 4 and a subsequent burst set transmission that utilizes 64 SSB candidate positions. In addition, exemplary scenario 310 shows LBT success occurring prior to SSB candidate position 8 and a subsequent burst set transmission that utilizes 64 SSB candidate positions.

A variety of different techniques may be implemented to signal the extended SSB index. In one exemplary technique, the SSB index may be indicated via the DM-RS sequence of the PBCH. For instance, the cell 120A may utilize the following scrambling sequence initialization ($c_{init}$) that incorporates the 7-bit SSB index. In this example, the SSB index is for 128 candidate SSB positions {0, . . . , 127} and is represented by $\overline{i_{SSB}}$.

$$c_{init} = 2^{11}(\overline{i_{SSB}} + 1)\left(\left\lfloor \frac{N_{ID}^{cell}}{4} \right\rfloor + 1\right) + 2^6(\overline{i_{SSB}} + 1) + (N_{ID}^{cell} \bmod 4)$$

In another exemplary technique, the SSB index may be included in the MIB payload. In a further exemplary technique, the SSB index may be split into two parts. A first part

Figure 4:
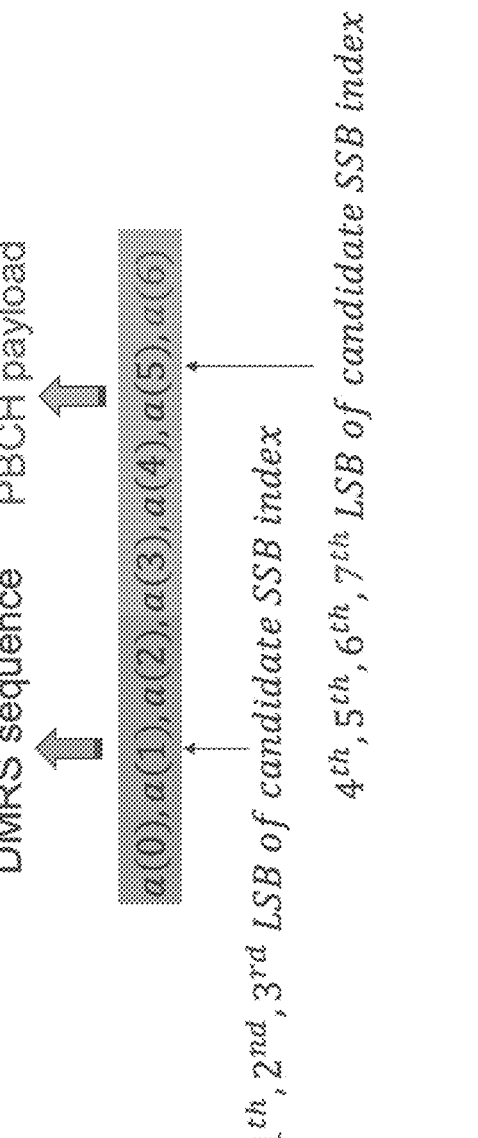
FIG. 4 illustrates an example of splitting a synchronization signal block (SSB) index into two parts that are to be jointly transmitted using demodulation reference signal (DM-RS) and physical broadcast channel (PBCH) channels according to various exemplary embodiments.

7 of the SSB index may be signaled via the DM-RS sequence and a second part of the SSB index may be signaled via PBCH payload. Thus, the SSB index may be split into two parts and jointly transmitted using DM-RS sequence and payload of PBCH channels, an example of which is illustrated in FIG. 4. In the example shown in FIG. 4, a first, second and third least significant bit (LSB) of the SSB index (e.g., a(0), a(1), a(2)) is included in the DM-RS sequence and a fourth, fifth, sixth and seventh LSB of the SSB index is included in the PBCH payload (e.g., a(3), a(4), a(5), a(6)). This technique provides a reasonable tradeoff between UE complexity due to hypothetical detection of a DM-RS sequence and the PBCH payload size and robustness.

In another exemplary technique, the SSB index may be split into three parts. For example, a first part of the 7-bit SSB index may include three bits (e.g., a(0), a(1), a(2)) that are signaled through different PBCH DM-RS sequences. A second part of the 7-bit SSB index may include three bits (e.g., a(3), a(4), a(5)) that are signaled in the PBCH payload. Thus, in this example, signaling of the first part and the second part may be similar to the example shown in FIG. 4. However, unlike the example shown in FIG. 4, a third part of the 7-bit SSB index may include a bit (e.g., a(6)) that is implicitly signaled through the configuration of the SSS, PSS and/or PBCH. The exemplary embodiments include a variety of different ways in which the third part of the SSB index (e.g., a(6)) may be implicitly signaled to the UE 110. Specific examples are provided in more detail below.

In some embodiments, signaling the third part (e.g., a(6) bit) of the SSB index may be based on the symbol location of the PSS and the SSS as shown in the table 500 of FIG. 5. Table 500 includes a first column 505 that indicates whether the bit a(6) is 0 or 1. In addition, the table includes a second column 510 that indicates the orthogonal division frequency multiplexing (OFDM) symbol number <x, y> relative to the start of an SSB, where x represents the PSS and y represents the SSS. Four exemplary configurations are referenced in the table 500 (e.g., 605-620) and described in more detail below with regard to FIG. 6.

Figure 6:
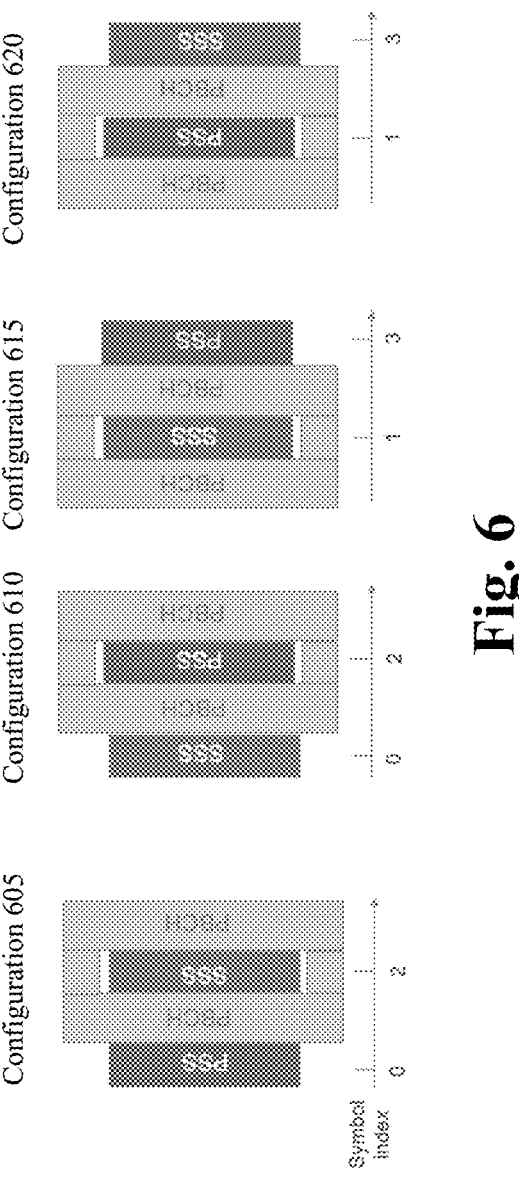
FIG. 6 illustrates four different exemplary SSB configurations that may be used to implicitly indicate a part of the SSB index according to various exemplary embodiments.

FIG. 6 illustrates four different exemplary SSB configurations that may be used to implicitly indicate the third part of the SSB index (i.e. a(6)). FIG. 6 will be described with regard to the table 500 of FIG. 5. In this example, a first configuration 605 may be used to indicate that a(6) is 0. The configuration 605 includes the PSS at symbol index 0 and the SSS at symbol index 2 i.e. pair of <0,2> in FIG. 5. Thus, when the UE 110 identities configuration 605 <0,2> for PSS and SSS, it may implicitly determine that a(6) is equal to '0' in accordance to FIG. 5.

In this example, three different configurations 610, 615 and 620 may be used to indicate that a(6) is 1. The configuration 610 includes the SSS at symbol index 0 and the PSS at symbol index 2. Compared to configuration 605, configuration 610 swaps the location of the PSS and the SSS. Thus, when the UE 110 identities configuration 610, it may implicitly determine that a(6) is equal to '1'.

The configuration 615 includes the SSS at symbol index 1 and the PSS at the symbol index 3. Note that the symbol index '0' is defined as the first symbol of SSB transmission. Compared to configuration 605, configuration 615 relocates the PSS from symbol index 0 to symbol index 3. Thus, when the UE 110 identities configuration 615, it may implicitly determine that a(6) is equal to '1'.

The configuration 620 includes the PSS at symbol index 1 and the SSS at symbol index 3. Compared to the configuration 605, configuration 620 right shifts the PSS and SSS by two symbols. Thus, when the UE 110 identities configuration 620, it may implicitly determine that a(6) is equal to '1'.

In some embodiments, the a(6) value may be indicated by different cyclic shifts of the PSS. The cyclic shifts may be represented by the following equation:

$$d_{pss}(n) = 1 - 2(m)$$

When a(6) is 0, m may be represented as:

$$(n + 43N_{ID}^{(2)})\bmod 127$$

When a(6) is 1, m may be represented as:

$$(n + k(N_{ID}^{(2)} - 1) + 43)\bmod 127$$

In this example, k may equal 21

$$\left(e.g., \left\lfloor \frac{43}{2} \right\rfloor\right).$$

Thus, depending on the PSS cyclic shift, the UE 110 may infer the value of a(6).

In other embodiments, the a(6) value may be indicated by different cyclic shifts of the SSS. The cyclic shift may be represented by the following equation when a(6) is 0:

$$d_{sss}(n) = [1 - 2x_0((n + m_0)\bmod 127)][1 - 2x_1((n + m_1)\bmod 127)]$$

The cyclic shift may be represented by the following equation when a(6) is 1:

$$d_{sss}(n) = [1 - 2x_0((n + m_0 + N)\bmod 127)][1 - 2x_1((n + m_1)\bmod 127)]$$

In this example, N may equal $$f(127)\left\lfloor \frac{127}{2} \right\rfloor = 63.$$

Thus, depending on the SSS cyclic shift, the UE 110 may infer the value of a(6).

In some embodiments, different maximum length sequences (m-sequences) are defined for the SSS to signal. For example, a first m-sequence may be used to indicate a(6) is 1 and a second different m-sequence may be used to indicate a(6) is 0.

In other embodiments, the value of a(6) may be signaled by different SSS resource element (RE) mapping patterns. For example, if a(6) is 0, the generated sequence of symbols $d_{sss}(0), \ldots, d_{sss}(126)$ may be sequentially mapped to RE(k,l) in increasing order of k, where k represents the frequency index and l represents the time index, respectively. If a(6) is 1, the generated sequence of symbols $d_{sss}(0), \ldots, d_{sss}(126)$ may be first interleaved and then sequentially mapped to RE (k,l) in increasing order of k.

Figure 7:
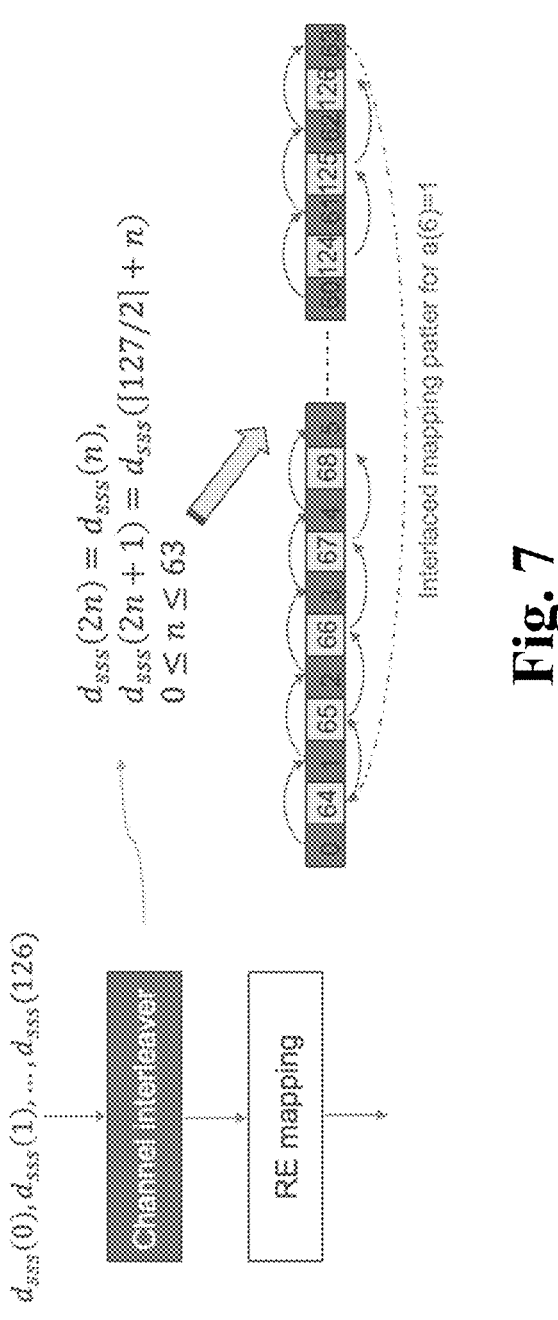
FIG. 7 shows an example of an exemplary SSS interlaced resource element (RE) mapping pattern according to various exemplary embodiments.

Thus, an interlaced (e.g., interleaved) mapping pattern may be used to indicate that a(6) is 1. FIG. 7 shows an example of an exemplary SSS interlaced RE mapping pattern.

In some embodiments, the PSS or SS sequence is scrambled with a binary scrambling code c(n) which may be represented by the following equation:

$$c(n) = \tilde{c}((n + a(6)) \bmod 127)$$

Figure 9:
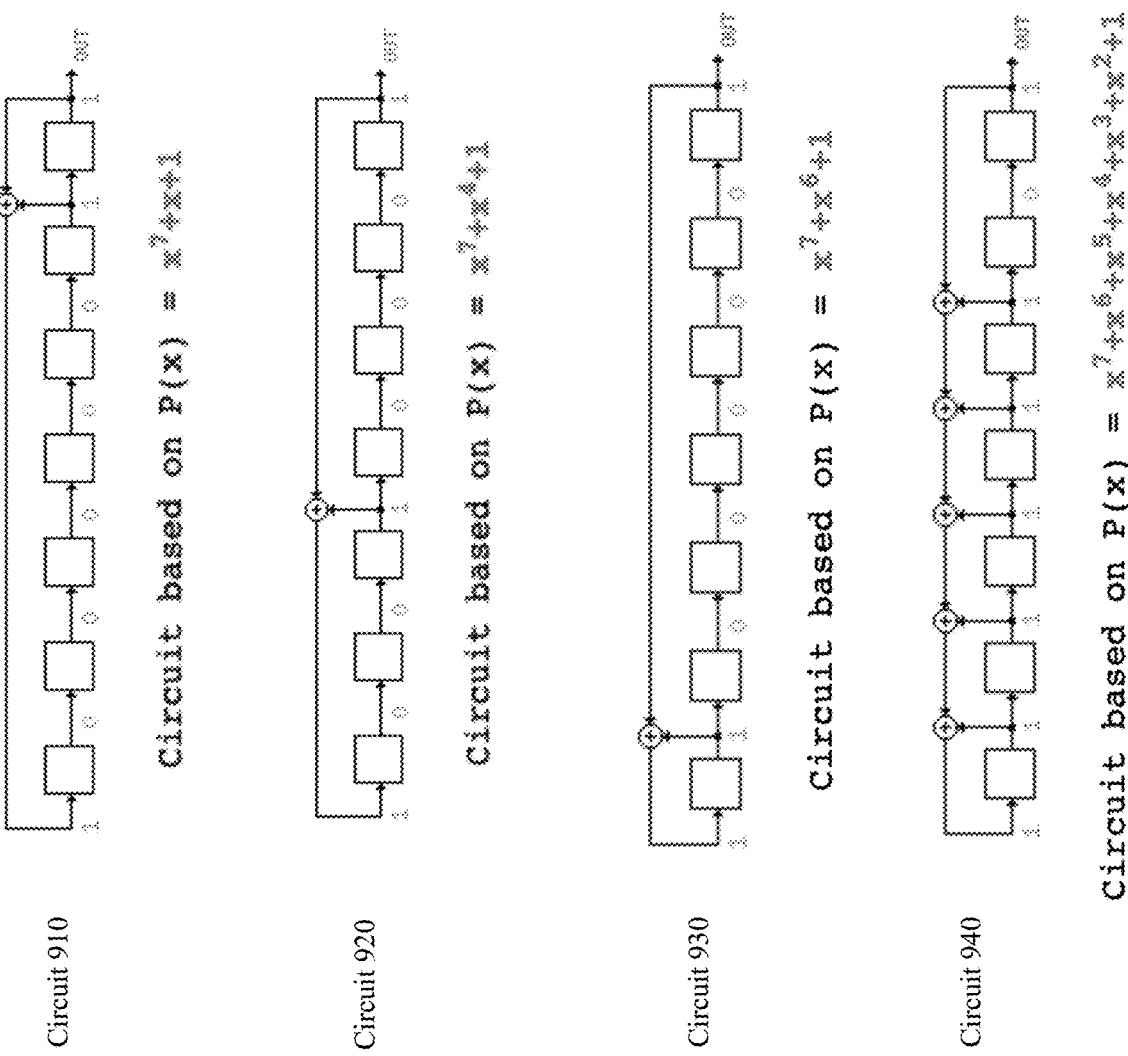
FIG. 9 shows an example of four different circuits that are each based on a different primitive polynomial according to various exemplary embodiments.

In this example, $\tilde{c}$ is generated from different primitive polynomials. FIG. 8 shows a table 800 that includes various examples of different binary scrambling codes that may be used to scramble the PSS or SSS. FIG. 9 shows an example of four different circuits 910-940 that are each based on a different primitive polynomial. Circuit 910 is based on 137 of table 800, circuit 920 is based on 157 of table 800, circuit 930 is based on 203 of table 800 and circuit 940 is based on 253 of table 800.

In some embodiments, a(6) may be carried by frozen bits of a PBCH polar code. When a(6) is carried by frozen bits, it is not part of input to the cyclic redundancy check (CRC) encoding and the CRC bits are not a function of a(6). Thus, at the cell 120A, CRC encoding is performed and then polar encoding is performed to incorporate a(6) into the SSB that is to be transmitted.

In other embodiments, a(6) may be carried by the selection of scrambling sequence $[W_0, W_1, \ldots W_{23}]$ to scramble the CRC bits of the PBCH. When a(6) is 0, the scrambling sequence $[W_0, W_1, \ldots W_{23}]$ may be $[0, 0, \ldots 0]$. When a(6) is 1, the scrambling sequence $[W_0, W_1, \ldots W_{23}]$ may be $[1, 1, \ldots 1]$.

Figure 10:
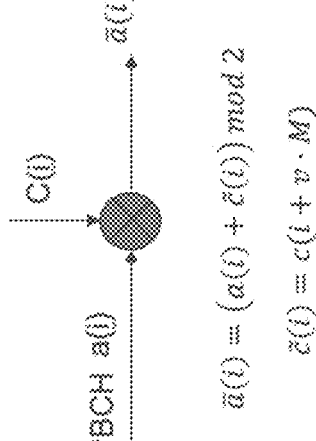
FIG. 10 shows a table that illustrates the value of v for PBCH scrambling according to various exemplary embodiments.

In some embodiments, a(6) is carried by a scrambling sequence prior to CRC attachment and encoding process. For example, the scrambling sequence may be based on a selection of value v to determine the segement of long gold sequence C. FIG. 10 shows a table 1000 that illustrates the value of v for PBCH scrambling.

Figure 11:
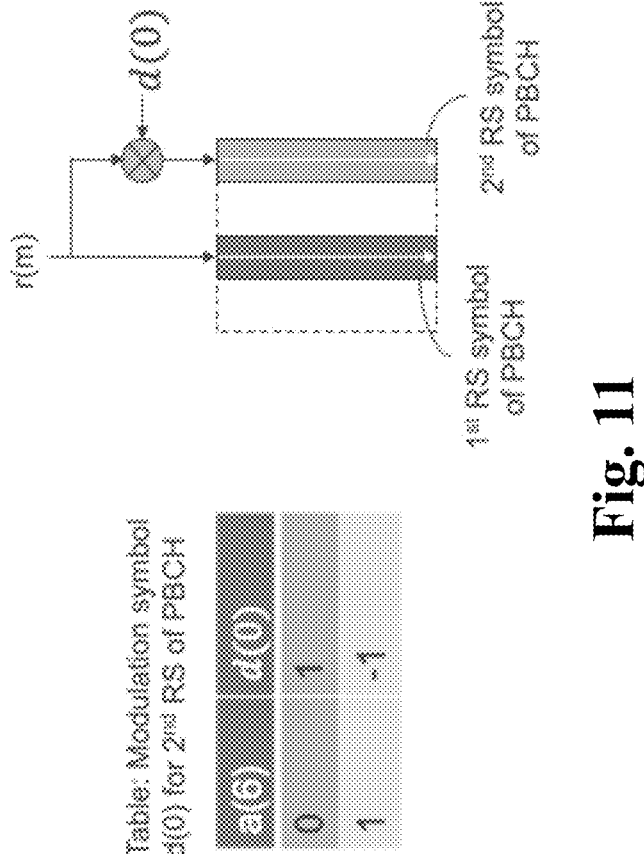
FIG. 11 shows an example of generating a reference symbol for PBCH transmission according to various exemplary embodiments.

In other embodiments, a(6) value may be modulated to generate a single modulation symbol d(0). This modulation symbol may be used in the generate of the reference symbol for PBCH transmission. FIG. 11 shows an example of generating a reference symbol for PBCH transmission.

In some embodiments, the candidate SSB index may be separately encoded with a CRC attachment. This may be performed at a low rate to ensure robustness. To minimize signaling overhead, the CRC may be short in length (e.g., 8-bit). In addition, the candidate SSB index block (CSSIB) may be mapped to a predefined set of RSs to facilitate neighbor cell measurement. Further, the resource partition between a legacy MIB and the CSSIB may be hard encoded or implementing via linearly splitting based on the payload of the MIB and CSSIB payload. For example, CSSIB symbols may be mapped with the frequency region corresponding to the PSS/SS. This allows the UE to operate with the bandwidth same as the PSS/SS bandwidth for inter-frequency neighbor cell measurement.

As mentioned above, in a second aspect, the exemplary embodiments describe a mechanism that allows a UE to determine the QCL assumptions for monitoring a CORE-SET across different DRS windows. In some embodiments, a set of Q values may be defined in standards (e.g., 3GPP standards) depending on the frequency range. The Q value may represent the number of SSBs and/or SSB candidate positions that may be used for SSB transmission. For example, above 6 gigahertz (Ghz) a set of Q values may be defined as {8, 16, 32, 64}.

Figure 12:
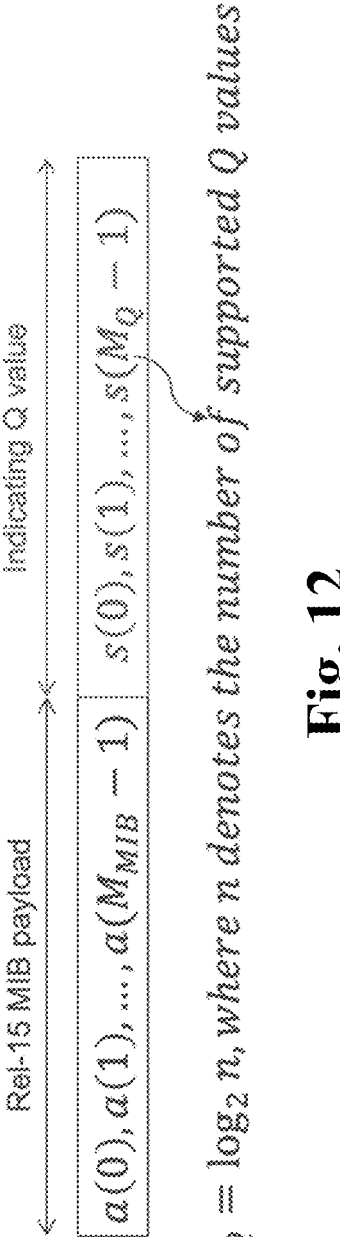
FIG. 12 shows an example of an extended master information block (MIB) payload according to various exemplary embodiments.

In some embodiments, the Q value may be indicated as part of an extended MIB payload. FIG. 12 shows an example of an extended MIB payload. For example, the rel-15 MIB payload may be extended to indicate the Q value, where $M_Q = \log_2 n$ and where n denotes the number of supported Q values.

In other embodiments, the Q value may be indicate by re-interpreting certain field in the legacy MIB. For example, the UE 110 may assume the same numerologies for the SSB and CORESET 0. Consequently, the UE 110 may interpret the following two information element (IEs) of rel-15 MIN for providing the Q value. In one configuration, the IE ssbSubcarrierSpacingCommon (1-bit) and the LSB of IE ssb-SubarrierOffset (1-bit) may be configured by the cell 120A to indicate the Q value to the UE 110. In another configuration, the IE ssbSubcarrierSpacingCommon (1-bit) and spare bit (1-bit) may be configured by the cell 120A to indicate the Q value to the UE 110.

In further embodiments, the Q value may be indicated as part of the system information block (SIB). For example, the cell 120A may configure the SIB to include an indication of the Q value.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry configured to:

configure one or more discovery reference signal (DRS) windows for transmission of synchronization signal blocks (SSBs) to a user equipment (UE); and generate, for transmission to the UE the SSBs, wherein the SSBs within the one or more DRS windows are quasi co-located, a number of SSBs to be transmitted is indicated by an SSB index, wherein a first portion of the SSB index comprises 3-bits that are signaled to the UE via different demodulation reference signal (DM-RS) sequences, wherein a second portion of the SSB index comprises 3-bits that are signaled to the UE via a physical broadcast channel (PBCH) payload, wherein a third portion of the SSB index comprises 1-bit that is implicitly signaled based on a symbol index of a primary synchronization symbol (PSS) and a symbol index of a secondary synchronization symbol (SSS).

2. The apparatus of claim 1, wherein a value of the 1-bit of the third portion of the SSB index is 0 when the symbol index of the SSS is 2 and the symbol index of the PSS is 0.

3. The apparatus of claim 1, wherein a value of the 1-bit of the third portion of the SSB index is 1 when the symbol index of the SSS is 0 and the symbol index of the PSS is 2.

4. The apparatus of claim 1, wherein a value of the 1-bit of the third portion of the SSB index 1 when the symbol index of the SSS is 1 and the symbol index of the PSS is 3.

5. The apparatus of claim 1, wherein a value of the 1-bit of the third portion of the SSB index 1 when the symbol index of the SSS is 1 and the symbol index of the PSS is 3.

6. A method, comprising:

configuring one or more discovery reference signal (DRS) windows for transmission of a synchronization signal blocks (SSBs) to a user equipment (UE); and transmitting the SSBs, wherein the SSBs within the one or more DRS windows are quasi co-located, a number of SSBs to be transmitted is indicated by an SSB index, wherein a first portion of the SSB index comprises 3-bits that are signaled to the UE via different demodulation reference signal (DM-RS) sequences, wherein a second portion of the SSB index comprises 3-bits that are signaled to the UE via a physical broadcast channel (PBCH) payload, wherein a third portion of the SSB index comprises 1-bit that is implicitly signaled based on a symbol index of a primary synchronization symbol (PSS) and a symbol index of a secondary synchronization symbol (SSS).

7. The method of claim 6, wherein a value of the 1-bit of the third portion of the SSB index is 0 when the symbol index of the SSS is 2 and the symbol index of the PSS is 0.

8. The method of claim 6, wherein a value of the 1-bit of the third portion of the SSB index is 1 when the symbol index of the SSS is 0 and the symbol index of the PSS is 2.

9. The method of claim 6, wherein a value of the 1-bit of the third portion of the SSB index 1 when the symbol index of the SSS is 1 and the symbol index of the PSS is 3.

10. The method of claim 6, wherein a value of the 1-bit of the third portion of the SSB index 1 when the symbol index of the SSS is 1 and the symbol index of the PSS is 3.

11. A base station, comprising:

a transceiver configured to connect to a user equipment (UE); and a processor communicatively coupled to the transceiver and configured to perform operations comprising:

configuring one or more discovery reference signal (DRS) windows for transmission of a synchronization signal blocks (SSBs) to the UE; and transmitting the SSBs, wherein the SSBs within the one or more DRS windows are quasi co-located, a number of SSBs to be transmitted is indicated by an SSB index, wherein a first portion of the SSB index comprises 3-bits that are signaled to the UE via different demodulation reference signal (DM-RS) sequences, wherein a second portion of the SSB index comprises 3-bits that are signaled to the UE via a physical broadcast channel (PBCH) payload, wherein a third portion of the SSB index comprises 1-bit that is implicitly signaled based on a symbol index of a primary synchronization symbol (PSS) and a symbol index of a secondary synchronization symbol (SSS).

12. The processor of claim 11, wherein a value of the 1-bit of the third portion of the SSB index is 0 when the symbol index of the SSS is 2 and the symbol index of the PSS is 0.

13. The processor of claim 11, wherein a value of the 1-bit of the third portion of the SSB index is 1 when the symbol index of the SSS is 0 and the symbol index of the PSS is 2.

14. The processor of claim 11, wherein a value of the 1-bit of the third portion of the SSB index 1 when the symbol index of the SSS is 1 and the symbol index of the PSS is 3.

15. The processor of claim 11, wherein a value of the 1-bit of the third portion of the SSB index 1 when the symbol index of the SSS is 1 and the symbol index of the PSS is 3.

\*   \*   \*   \*   \*